Sept. 3, 1935.　　　J. EGGERT ET AL　　　2,013,178

PROJECTION APPARATUS

Filed Feb. 19, 1934

Inventors:
John Eggert,
Gerd Heymer,
by Potter, Pierce + Scheffler
Attorneys.

Patented Sept. 3, 1935

2,013,178

UNITED STATES PATENT OFFICE 2,013,178

PROJECTION APPARATUS

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application February 19, 1934, Serial No. 712,078
In Germany February 22, 1933

2 Claims. (Cl. 88—16.4)

Our present invention relates to the projection of lenticular film.

One of its objects is an apparatus for projecting lenticular film. Further objects will be seen from the detailed specification following hereafter.

It has already been proposed to use the multicolor filter necessary for projecting lenticular films in natural colors a lamp mirror which has been subdivided into zones of different color in accordance with the otherwise used multi-color filter. Though with this arrangement a good yield of the light employed is obtained, the colors of the reproduced picture are considerably turned into white, if the picture is produced with sufficient brightness. Furthermore, it is not possible to vary separately the intensity of the differently colored portions of the projection light, as it is often desirable. These drawbacks are overcome by the present invention.

According to this invention the source of light consists of a series of gas discharge lamps having different colors. These lamps are so arranged that, when viewed from the side of the film, they lie in the optical center occupied during the taking and the preparation of the print by the virtual filter image.

The source of light normally used is composed of three gas discharge lamps radiating light in the fundamental colors red, green and blue. It is, however, also possible to use any number of lamps radiating colored light according to requirement. The different lamps are preferably so mounted that they can be displaced against one another and that the system of lamps, as a whole may be adapted to different sizes of the taking filter.

The invention will now be described with reference to the accompanying drawing in which Fig. 1 shows an arrangement for projection according to this invention, Fig. 2 shows gas discharge lamps for projecting according to the invention, and Fig. 3 shows a device for displacing the gas discharge lamps.

Referring to Fig. 1, A designates the lenticular film, B indicates the position of the virtual image of the multicolor filter with which the lenticular film has been taken. This virtual image is projected in the photographic layer D of the film by the lenticular elements in such a manner that images of the virtual image of the filter projected by the lenticular elements on the margins of the film are displaced towards the edges of the film. This displacement depends on the distance of the virtual image of the filter from the film in taking. A good reproduction of the colors is only obtained if in projection the multi-color filter is arranged at the same distance from the film as the virtual image of the filter was arranged from the original in taking. As in the present case the multi-color filter is replaced by colored projection lamps, the latter must be arranged in the optical centers of the areas of the virtual image of the taking filter. In projection the gas discharge lamps blue, green and red must therefore be arranged in the optical centers of the filter areas in taking if a multi-color filter with these colors has been used. In Fig. 1 there are arranged the lamps $L_1$, $L_2$ and $L_3$ in the optical centers $b$, $g$ and $r$ of the blue, the green and the red filter strip of the taking filter.

Figure 1:
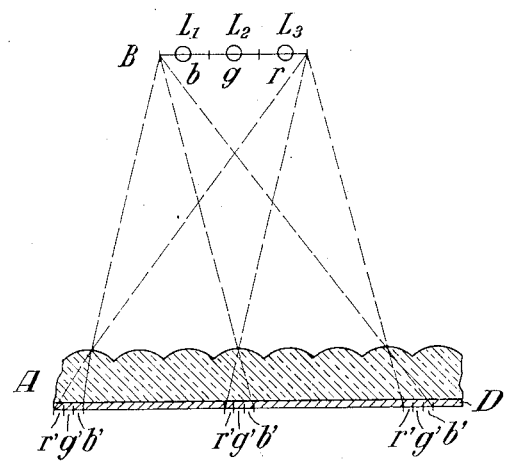
Figure 2:
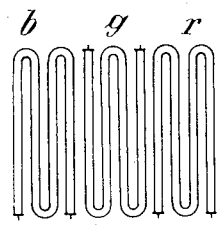
Fig. 2 shows repeatedly bent discharge tubes arranged in accordance with the principles described with reference to Fig. 1. In this case the corresponding filter area is illuminated to a greater extent.
Figure 3:
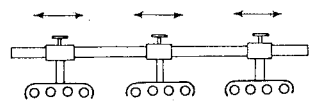
Fig. 3 shows a simple device by which the differently colored gas discharge lamps can be laterally displaced. This possibility is necessary if the same device shall be used for the projection of films which have been taken with different filters.

What we claim is:

1. In an apparatus for projecting lenticular film in combination, a lenticular film, and at a distance from the film in the plane which is usually occupied by the multi-color filter gas discharging lamps assuming on electrical excitation the required colors for reproducing the original on said film in natural colors and arranged at places corresponding with the optical centers of the filter strips of the otherwise used multi-color filter.

2. In an apparatus for projecting lenticular film in combination, a lenticular film, and at a distance from the film in the plane which is usually occupied by the multi-color filter gas discharging lamps assuming on electrical excitation the required colors for reproducing the original on said film in natural colors and arranged at places corresponding with the optical centers of the filter strips of the otherwise used multi-color filter, and means for laterally displacing said gas discharging tubes.

JOHN EGGERT.
GERD HEYMER.